United States Patent [19]

Uehara et al.

[11] Patent Number: 5,389,331

[45] Date of Patent: Feb. 14, 1995

[54] METHOD OF INJECTION MOLDING MULTI-PLY PRODUCTS USING PLASTIC HEAT-INSULATING BARRIER LAYER

[75] Inventors: Shinichi Uehara; Koichi Sato, both of Ueda, Japan

[73] Assignee: Nissei ASB Machine Co., Ltd., Nageno, Japan

[21] Appl. No.: 101,110

[22] Filed: Aug. 3, 1993

Related U.S. Application Data

[63] Continuation of Ser. No. 783,249, Oct. 28, 1991, abandoned.

[30] Foreign Application Priority Data

Oct. 31, 1990 [JP] Japan .................. 2-296338

[51] Int. Cl.⁶ .................. B29C 45/16; B29C 45/17
[52] U.S. Cl. .................. 264/513; 264/255; 264/328.8; 264/328.14; 264/328.15
[58] Field of Search .................. 264/255, 318, 328.16, 264/510, 328.8, 328.14, 328.15, 519, 512, 513; 425/130

[56] References Cited

U.S. PATENT DOCUMENTS

| | | | |
|---|---|---|---|
| 2,617,152 | 11/1952 | Rubin | 264/328.14 |
| 2,928,125 | 3/1960 | Smucker et al. | 264/328.16 |
| 4,378,963 | 4/1983 | Schouenberg | 264/328.8 |
| 4,540,541 | 9/1985 | Harding | 264/328.14 |
| 4,609,341 | 9/1986 | Müller | 264/328.8 |
| 4,609,516 | 9/1986 | Krishnakumar | 264/328.8 |
| 4,657,496 | 4/1987 | Ozeki et al. | 264/328.8 |
| 4,781,572 | 11/1988 | Boring | 264/328.9 |
| 4,830,809 | 5/1989 | Liebl | 264/257 |
| 4,863,665 | 9/1989 | Schad et al. | 264/328.14 |
| 4,932,858 | 6/1990 | Gellert | 264/328.9 |
| 4,957,682 | 9/1990 | Kobayashi et al. | 264/255 |
| 5,106,291 | 4/1992 | Gellert | 264/328.9 |
| 5,143,733 | 9/1992 | Von Buren et al. | 264/328.9 |

FOREIGN PATENT DOCUMENTS

| | | |
|---|---|---|
| 63-107525 | 5/1988 | Japan . |
| 63-221024 | 9/1988 | Japan . |
| 63-37222 | 10/1988 | Japan . |
| 63-239022 | 10/1988 | Japan . |

*Primary Examiner*—Jan H. Silbaugh
*Assistant Examiner*—Angela Ortiz
*Attorney, Agent, or Firm*—Oliff & Berridge

[57] ABSTRACT

A method of injection molding multi-ply products includes the step of forming an insulating barrier layer from one of different plastic materials used to injection mold multi-ply products, between an injection cavity mold and each of hot-runner nozzles, prior to the injection mold. The insulating barrier layer is formed by pre-charging one of the plastic materials which is the best thermostability into a recess formed in the hot-runner nozzle at its surface contacted by the injection cavity mold, the recess communicating with the exit port of the hot-runner nozzle. The plastic material charged in the recess is cooled and solidified by the injection cavity mold. The insulating barrier layer formed by the solidified plastic material is less thermally deteriorated by heat from a hot-runner mold for a prolonged time period. The heat-insulating property of the insulating barrier layer can be assured during a continuous injection molding process over a week.

11 Claims, 2 Drawing Sheets

METHOD OF INJECTION MOLDING MULTI-PLY PRODUCTS USING PLASTIC HEAT-INSULATING BARRIER LAYER

This is a continuation of application Ser. No. 07/783,249, filed Oct. 28, 1991, now abandoned.

BACKGROUND OF THE INVENTION

1. Field of the Invention

The present invention relates to a method of injection molding multi-ply products particularly using a plastic heat-insulating barrier layer between an injection cavity mold and a hot-runner nozzle.

2. Description of the Related Art

Exemplifying a stretch-blow molded bottle, it is required to have barrier properties against oxygen and carbon dioxide, a heat resistance and others. To meet these requirements, the preform of a bottle to be blow molded may be injection molded into a three-layered structure which includes inner and outer layers of structural resin material such as polyethylene terephthalate and an intermediate layer interposed therebetween and made of another resin material which satisfies the aforementioned requirements. Many hot-runner molds used for injection molding such a multi-ply product are known as from Japanese Utility Model Publication No. She 63-37222, Japanese Patent Laid-Open No. Sho 63-107525, Japanese Patent Laid-Open No. Sho 63-221024, Japanese Patent Laid-Open No. Sho 63-239022 and so on.

Such a multi-ply molding is carried out by charging different molten plastic materials into a space between an injection cavity mold and a core mold through the nozzles of a multi-ply molding hot-runner mold.

When performs are generally to be injection molded without limiting to the multi-ply molding, it is required to insulate between the injection cavity mold and the hot-runner nozzle. The hot-runner nozzle is at a raised temperature near the molding temperature of plastic material, for example, two hundred and several tens °C while tile injection cavity mold is only about 10° C.—about 80° C. Such a substantial temperature difference between the injection cavity mold and the hot-runner nozzle will cool the hot-runner nozzle to tile undesirably low temperature, resulting in reduction of the temperature at the inject ion port of the hot-runner nozzle. Thus, the plastic material being charged will be cooled and solidified at the injection port, leading to clogging therein.

In order to overcome such a problem, it is known to dispose an insulation material between the injection cavity mold and tile hot-runner nozzle. Since the property elf such an insulation material degrades due to heat deterioration with the passage of time, it must be frequently replaced by a new insulation material. The replacement of insulation not only requires a troublesome dis-assembly of mold, but also very reduces the efficiency of production since an increased time is required to heat up the mold after it has been once cooled down.

It is also known to form an insulating barrier layer from the plastic material being charged into the injection cavity mold. This barrier layer is superior to the aforementioned insulation in that the barrier layer will not be affected by heat deterioration for a relatively prolonged period.

When a plurality of different plastic materials are used to form a preform of multi-ply cross-section structure, one must note that each of-these plastic materials has its inherent heat-resistant temperature. If the heat-resistant temperature of a plastic material used to form an insulating barrier layer is lower than those of the other plastic materials used together, that plastic material may be thermally deteriorated for a relatively short time period, as in the insulation material. In addition, the plastic material reduced in viscosity due to heat deterioration may be injected into tile injection cavity mold to mold an unacceptable product. For example, ethylene-vinyl alcohol copolymer (hereinafter referred to EV-OH) effective to form a barrier layer has its molding-temperature about 50° C. lower than that of polyethylene terephthalate (hereinafter referred to PET). This is substantially similar to the difference or heat-resistant temperature between these plastic materials. When such two difference plastic materials are to be injection molded into a product and if no consideration is taken with respect to the formation of an insulating barrier layer, these difference plastic materials will be combined at the injection port of the hot-runner nozzle and then flow into a region of forming the barrier layer therethrough. The barrier layer may be partially or at the worst entirely formed of EV-OH. The barrier layer thus formed will relatively easily deteriorate due to heat from the other plastic materials having higher molding temperatures.

There are also plastic materials which will thermally deteriorate when they are subjected to heat for a prolonged time period. In order to avoid the above problems, plastic materials used to form the insulating barrier layer should be selected carefully.

SUMMARY OF THE INVENTION

It is therefore an object of the present invention to provide a method of injection molding a multi-ply product from a plurality of different plastic materials while forming an insulating barrier layer from one of the plastic materials used, the barrier layer being capable of maintaining its required insulating property for a relatively prolonged time period.

Another object of the present invention is to provide an injection molding method of such a type, which can maintain the quality of multi-ply moldings constant throughout the continuous injection molding process.

To this end, the present invention provides a method of injection molding a multi-ply product by charging a plurality of different molten plastic materials into an injection cavity mold through a hot-runner nozzle which is operatively connected to the injection cavity mold, said method comprising the steps of pro-charging one of said plastic materials which is most thermostable into a recess formed to communicate with tile path of plastic material in tile hot-runner nozzle at its surface contacted by the injection cavity mold, and using said one plastic material solidified in said recess as an insulating barrier layer between the injection cavity mold and the hot-runner nozzle during injection molding of the multi-ply products.

In accordance with tile present invention, prior to the injection molding process, one of the plastic materials which is most thermostable is charged into the recess in the hot-runner nozzle. The charged plastic material is cooled and solidified in the recess to form an insulating barrier layer between tile injection cavity mold and tile hot-runner nozzle. Thereafter, the molten plastic materials including a main material such as PET are injection molded into the desired products. The injection molding process is continued for a prolonged time period, or typically for a week. The insulating barrier layer so formed can assure its heat-insulating property.

If the injection molding process is continued without taking the present invention, the plastic material forming the insulating barrier layer would be easily thermally deteriorated and should be frequently replaced by a new insulating barrier layer. This results in limitation in the operating time of the injection molding machine. In addition, the viscosity of the plastic barrier material will be degraded. Thus, the plastic barrier material will flow from the recess into the injection cavity mold together with the plastic materials to be charged thereinto. Since the thermally degraded plastic material has lost its inherent properties and also may be discolored into black in case of using polyamide, the resulting products do not have their acceptable appearance together with the other desirable characteristics.

Particularly where the injection molding process is carried out while maintaining the temperature of the hot-runner nozzle at the highest molding temperature of those of the plastic materials used, the present invention is advantageous in that the insulating barrier layer will not be thermally deteriorated throughout the continuous injection molding process for a prolonged time period. When the molding temperatures inherent in the respective plastic materials are close to each other and even if the temperature of the hot-runner nozzle is regulated to the lowest molding temperature of those of the plastic materials, the insulating barrier layer formed of a plastic material having a relatively high thermostability will not thermally be deteriorated. On the contrary, if an insulating barrier layer is formed of a plastic material having its relatively low thermostability and when the resulting barrier layer is subjected to a temperature lower than the molding temperature of that plastic material for a prolonged time period, the insulating barrier layer will be thermally deteriorated with the passage of time to lose its heat-insulating property.

One of multi-ply products injection molded from a plurality of different plastic materials is a preform subsequently molded into a hollow container which is required to have various superior properties such as heat-resistance and barrier properties. When such a perform is to be injection molded, a proper combination of different plastic materials will be selected to satisfy properties required in a final container.

If a preform is to be injection molded by using PET as a main plastic material having its superior mechanical strength and EV-OH having a good gas barrier property, the insulating barrier layer is formed by the PET material which has its molding temperature and thermostability higher than those of the EV-OH material.

If the main plastic material, PET, is used together with a polyamide plastic material having a high barrier property, the insulating barrier layer is formed by the PET material which has its molding temperature substantially equal to or slightly higher than that or the polyamide material, but is less thermally deteriorated with the passage of time in comparison with the polyamide material. The use of the PET material to form the insulating barrier layer is more preferred particularly in the standpoint of maintenance of the quality in the appearance of the final product since the polyamide material tends to be discolored into black due to heat deterioration.

If a polyarylate having a high heat-resistance is used with the main PET material, the insulating barrier layer is formed by the PET material which has its molding temperature substantially similar to that of the polyarylate material, but is superior to the polyarylate in heat-deterioration with the passage of time.

If a polypropylene is used as a main plastic material and when the EV-OH material is used to strengthen the relatively lower barrier property of the polypropylene, the insulating barrier layer is formed by the polypropylene material which tends to have its molding temperature higher than that of the EV-OH material and is less thermally deteriorated than the EV-OH material.

If a polypropylene is used as a main plastic material and when acrylonitrile is used to strengthen the less barrier property of the polypropylene, the insulating barrier layer is formed by the polypropylene which has its molding temperature higher than that of the acrylonitrile and is less thermally deteriorated than the acrylonitrile.

If a polycarbonate is used as a main plastic material and when polyamide is used to strengthen the less barrier property of the polycarbonate, the insulating barrier layer is formed by the polyamide which has its molding temperature substantially similar to that of the polycarbonate but is less thermally deteriorated than the polycarbonate.

DETAILED DESCRIPTION OF THE PREFERRED EMBODIMENTS

The present invention will now be described in detail in connection with one embodiment thereof in which the present invention is applied to an injection molding method used for injection molding a three-ply product from two different plastic materials.

Figure 1:
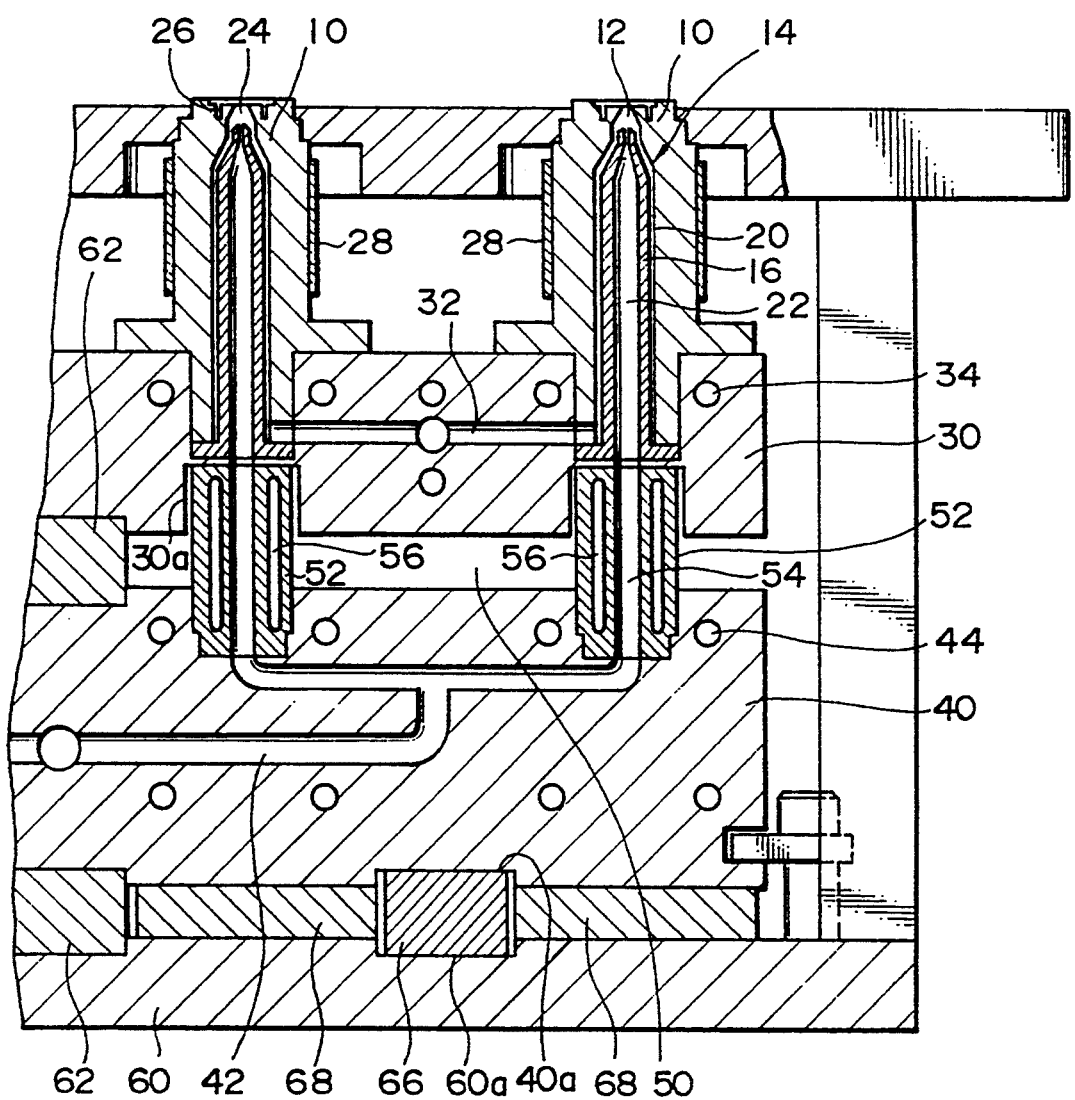
FIG. 1 is a cross-section of a hot-runner mold including the nozzle body of an apparatus for injection molding a multi-ply preform in accordance with the principle of the present invention.

Referring to FIG. 1, a mold used in this embodiment is similar to that of U.S. patent application Ser. No. 07/729,327, now U.S. Pat. No. 5,232,710, which is applied to injection mold a preform which is a primary molding used for forming a final bottle-shaped product. The hot-runner mold generally comprises nozzle bodies 10, first and second hot-runner blocks 30, 40 for receiving the respective one of two different plastic materials, an air gap 50 for thermal insulation formed between the first and second blocks 30 and 40, and connection blocks 52 for forming plastic material passages between the first and second blocks 30 and 40.

Each of the nozzle bodies 10 is of a cylindrical configuration, with the top end thereof including an exit or injection port 12. The cylindrical nozzle body 10 includes a central bore 14 formed axially therethrough and communicating with the exit port 12. The central bore 14 receives a cylindrical hollow torpedo 16 which is centrally disposed spaced away from the inner wall of the bore 14 to form a first, annular plastic material passage 20 therebetween. The torpedo 16 includes a central bore or second plastic material passage 22 formed therein. Thus, these first and second plastic material passages 20 and 22 will define a concentric double-passage means.

Figure 2:
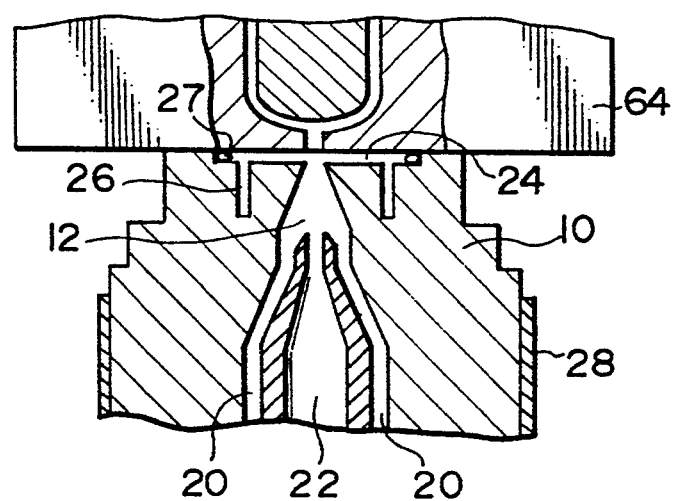
FIG. 2 is an enlarged cross-section of the nozzle body shown in FIG. 1.

As can be best soon from FIG. 2, the exit port 12 of each nozzle body 10 is opened into a circular recess 24 formed in the nozzle body 10 at the top end thereof. The recess 24 further communicates ,with a vertically extending ring-shaped slit 26 formed in the top end of-the nozzle body 10 to encircle the exit port 12 thereof. The recess 24 receives any sealing means such as a metallic O-ring 27 for preventing any leakage of the plastic material.

Each of the first and second hot-runner blocks 30 and 40 is of a rectangular cross-section and includes a first or second runner 32 or 42 formed therein. Each of the first and second runners 32 or 42 serves to connect a sprue (not shown) in the respective one of the blocks 30 and 40 with the first or second plastic material passage 20 or 22 in each nozzle body 10. The illustrated hot-runner mold can be used in simultaneously injection molding a plurality of products, for example, four moldings.

Each of the runners 32 and 42 is formed such that all the flow passages extending from the sprue (not shown) open at the side of the corresponding hot-runner block 30 or 40 to the respective plastic material passages 20 and 22 will have an equal length. Such an arrangement of passage is known as be of a balance type wherein all the runners are arranged and connected in a tournament-table configuration.

The first and second hot-runner blocks 30 and 40 are vertically stacked one above another through the air gap or thermal insulation layer 50. To this end, the respective hot-runner blocks 30 and 40 are partially engaged and held by a hot-runner pressure receiving plate 62 which is in turn fixedly mounted on a hot-runner holding plate 60. The air gap 50 is formed between the blocks 30 and 40 at a region other than the pressure receiving plate 62 and the connection blocks 52.

The holding plate 60 and tile second hot-runner block 40 include key grooves 60a and 40a formed therein, respectively. When these key grooves 60a and 40a receive a key 66, the second hot-runner block 40 can be positioned relative to the holding plate 60 in a direction perpendicular to the sheet of the drawing. A thermal insulation layer (or air gap) 68 is formed between the holding plate 60 and the second hot-runner block 40 at the region other than the key-groove connection.

The first and second hot-runner blocks 30 and 40 are vertically spaced away from each other through the air gap 50. Each of the connection blocks 52 includes a third runner 54 formed therein for conducting a plastic material from the second or lower hot-runner block 40 into the second plastic material passage 22 in the corresponding nozzle body 10. The connection block 52 is firmly held between the first and second blocks 30 and 40 by embedding the top and bottom ends thereof in the respective blocks 30 and 40. Particularly, the top end of the connection block 52 extends to a position approximate to the lower end of the corresponding nozzle body 10 in the interior of the first hot-runner block 30. An air gap for thermal insulation is formed between the sidewall of the embedded end of the connection block 52 and the inner wall of the hole 30a in the first hot-runner block 30. Alternatively, such an air gap can be replaced by any other suitable thermal insulation material.

Temperature control means will now be described for each of the plastic materials.

Each of the first and second hot-runner blocks 30 and 40 may include first, or second internal cartridge type heaters 34 or 44 which is disposed at a position approximate to the first or second runner 32 or 42. A plastic material passed through or stayed in the runner 32 or 42 may be maintained at its own inherent molding temperature by the corresponding internal heaters 34 or 44. The temperature of each of the first and second heaters 34 and 44 may be independently controlled as by the use of a feedback signal from a thermocouple for measuring the temperature of the first and second hot-runner blocks 30 and 40.

Each of the nozzle bodies 10 includes a band heater 28 wound around the outer wall thereof for heating the plastic material flowing in the first or outer plastic material passage 20 of the nozzle body 10. Each of the connection blocks 52 also includes a third internal heater 56 provided therein along the third runner 54.

These internal heaters for heating the blocks 30, 40 and 52 may be replaced by any other suitable heating means such as a combination of heat pipes with the internal heaters. In such a case, the heat pipes may be arranged along tile respective runners 32, 42 and 54. A heater may be disposed parallel to the corresponding heat pipe or at the end of the heat pipe.

Operation will now be described with respect to the aforementioned arrangement.

Prior to the description of tile actual operation, it will be better to describe the molding temperatures of plastic materials which are usable in the present invention:

| | |
|---|---|
| PET | 275° C.; |
| Polyarylate | 280° C.; |
| Polyamide | 270–300° C.; |
| Polypropylene | 200–300° C.; |
| Polycarbonate | 260–300° C.; |
| EV-OH | 190–230° C.; and |
| Acrylonitrile | about 200° C. |

However, the above molding temperatures depend on the material supplied by different manufacturers and the grade of the material used.

It is now assumed that the outer and inner layers in an injection molded product are made of PET resin while the intermediate layer therebetween is made of EV-OH resin.

In this embodiment, an insulating barrier layer is formed in said recess and circular slit 24, 26 prior to the injection molding process of the preform. The insulating barrier layer is formed from the PET plastic material which is more thermostable. The PET plastic material is introduced into the first plastic material passage 20 of each of the nozzle bodies 10 through a sprue (not shown) of the first hot-runner block 30 via the first runner 32. The PET plastic material is then charged into a cavity mold 64 through the exit port 12 to mold a dummy. At this time, the PET plastic material also flows into the recess and slit 24, 26 which communicate with the exit port 12. In the recess and slit 24, 26, the PET plastic material is cooled and solidified by the cavity mold 64 and remains therein as it is. During the subsequent injection molding process, the solidified PET plastic material will be utilized as an insulating barrier layer. The PET plastic material can be relatively easily formed into the insulating barrier layer since it is a main plastic material and receives a larger charging force from the screw an injection machine (not shown).

Subsequently, the dummy previously molded only from the PET plastic material to form the insulating barrier layer is removed from the mold. Thus, the continuous injection molding of preforms from the two different plastic materials may be initiated.

The PET plastic material is conducted into the first runner 32 of the first hot-runner block 30 through the sprue thereof (not shown). The plastic material is then conducted from the first runner 32 to the first plastic material passage 20 of each of the nozzle bodies 10. On the other hand, EV-OH plastic material is conducted from the sprue (not shown) of the second hot runner block 40 through the second and third runners 42 and 54 into the second plastic material passage 22 of each of the nozzle bodies 10.

As shown in the above table, the molding temperature of the PET plastic material is 275° C. while the molding temperature of the EV-OH plastic material is 230° C. A difference between the molding temperatures of these resins will be as high as 45° C. In the illustrated embodiment, however, the molding temperature of the PET plastic material can be maintained by the first heaters 34 in the first hot-runner block 30 while the molding temperature of the EV-OH plastic material can be maintained by the second heaters 44 in the second hot-runner block 40. Since the hot-runner blocks 80 and 40 are spaced away from each other through the air gap 50, no inter-solid heat transfer will be created between them only with a heat exchange due to convection. This enables the thermal affection from one hot-runner block to the other to be very reduced, resulting in accurate maintenance of the molding temperatures inherent in the respective plastic materials to be injection molded. Particularly, since the amount of plastic material contained in each of the first and second runners 32 and 42 is equal to a plurality of shots, the plastic material and particularly EV-OH plastic material may be prevented from being pyrolytically decomposed and degraded by the thermal effects from the other hot-runner block if its own molding temperature is maintained for a sufficient time period before injected. After passing through the second runner 42, the EV-OH plastic material is conducted into the second plastic passages 22 of the nozzle bodies 10 through the third runners 54 of the respective connection blocks 52. In this connection, the third heater 56 of each of the connection blocks 52 is controlled to provide a temperature approximate to that of the second heaters 44 in the second hot-runner block 40. Therefore, the EV-OH plastic material will also be maintained at its own inherent molding temperature in each of the connection blocks 52. Since the top end of each connection block 52 is embedded in the first hot-runner block 30 adjacent the corresponding nozzle body 10 and the plastic material flowing in this connection block is controlled in temperature by the third heater 56 immediately before it is conducted into the corresponding nozzle body 10, the pyrolytical decomposition of the EV-OH plastic material can be minimized. Since there is an air gap or-thermal insulation between the connection block 52 and the first hot-runner block 80, the thermal affection of the connection block 52 from the first hot-runner block 30 can be reduced effectively.

The PET and EV-OH resins conducted into the first and second plastic passages 20 and 22 in each of the nozzle bodies 10 are merged-together at a position adjacent the exit port 12 and then injected into the interior of a cavity mold 64, as shown in FIG. 2. At this time, the band heater 28 around the outer wall of the nozzle body 10 is controlled to a temperature approximate to the temperature of the first heaters 34 in the first hot-runner block 30 such that the PET plastic material flowing in the first plastic material passage 20 of the nozzle body 10 is maintained at its own inherent molding temperature. Thus, the moldability of the PET plastic material can be improved. At the same time, the plastic material flowing in the second or inner plastic material passage 22 can be protected from the thermal affection of the band heater 28 of the nozzle body 10 by the PET plastic material encircling the torpedo 16. Therefore, the pyrolytical decomposition of the EV-OH plastic material due to the molding temperature of the PET plastic material can be minimized before they are merged together near the exit port 12 of the nozzle body 10.

Thermal insulation between each nozzle body 10 and the cavity mold 64 will be described below.

The nozzle bodies 10 are regulated to the molding temperature inherent in the PET plastic material while the temperature of the cavity mold 64 is ranged between about 10° C. and about 30° C. This creates a substantially temperature difference between the nozzle bodies 10 and the cavity mold 64. After solidified in the recess 24, the PET plastic material serves as a heat insulator between the cavity mold 64 and the nozzle bodies 10, such that the region around the exit port 12 of each of the nozzle bodies 10 will be prevented from being cooled. Furthermore, since the circular slit 26 is formed over the exit port 12 to communicate with the recess 24, the PET plastic material solidified in the slit 26 also serves as an effective heat insulator around the exit port 12.

In this embodiment, particularly, the insulating barrier layer is formed from the PET plastic material which is one of the two plastic materials used which has its molding temperature higher than that of the remaining plastic material. Therefore, the heat insulation can be maintained for a relatively prolonged time period without heat deterioration. Alternatively, even if the EV-OH plastic material is passed through the first plastic material passage 20 while tile nozzle bodies 10 are regulated to the molding temperature of the EV-OH plastic material, the PET plastic material forming the insulating barrier layer will never be thermally deteriorated.

It is to be understood that the present invention is not limited to the aforementioned embodiment and can be carried out by a person skilled in the art with many modifications and changes without departing the concept of the present invention.

The aforementioned embodiment of the present invention is only illustrated by way of example and can be carried out using any plastic material having the best thermostability among various plastic materials which can be used to mold the insulating barrier layer in accordance with the present invention.

Without limitation to the aforementioned hot-runner mold, tile present invention may be applied to any system which can injection mold a plurality of different plastic materials through nozzle exit ports to form multi-ply products.

We claim:

1. A method of injection molding a multi-ply product by charging a plurality of molten plastic materials into an injection cavity mold through a hot-runner nozzle operatively connected to the injection cavity mold, said method comprising the steps of:

injection molding a dummy article having a single layer by charging a most thermostable one of said plastic materials into said injection cavity mold, whereby said one plastic material is pre-charged into a recess formed to communicate with an exit port for the hot-runner nozzle, said recess being located at an interface between the hot-runner nozzle and the injection cavity mold;

removing said dummy article from said injection cavity mold leaving a solidified plastic material from the dummy article to form an insulator in the recess; and maintaining said one plastic material forming said insulator solidified in said recess as an insulating barrier layer between the injection cavity mold and the hot-runner nozzle during successive steps of injection molding multi-ply products from said molten plastic materials.

2. A method as defined in claim 1 wherein said injection molding step is carried out while maintaining said hot-runner nozzle at a temperature substantially equal to the molding temperature inherent in one of said plurality of different plastic materials.

3. A method as defined in claim 2 wherein said multi-ply products are in the form of a preform used to mold a hollow container.

4. A method as defined in claim 3 wherein said preform is injection molded from a combination of polyethylene terephthalate with ethylene-vinyl alcohol copolymer, said polyethylene terephthalate being used to form inner and outer layers and said ethylene-vinyl alcohol copolymer being used to form an intermediate layer between said inner and outer layers and wherein said insulating barrier layer is formed from the polyethylene terephthalate.

5. A method as defined in claim 3 wherein said preform is injection molded from a combination of polyethylene terephthalate with polyamide, said polyethylene terephthalate being used to form inner and outer layers and said polyamide being used to form an intermediate layer between said inner and outer layers and wherein said insulating barrier layer is formed from the polyethylene terephthalate.

6. A method as defined in claim 3 wherein said preform is injection molded from a combination of polyethylene terephthalate with polyarylate, said polyethylene terephthalate being used to form inner and outer layers and said polyarylate being used to form an intermediate layer between said inner and outer layers and wherein said insulating barrier layer is formed from the polyethylene terephthalate.

7. A method as defined in claim 3 wherein said preform is injection molded from a combination of polypropylene with ethylene-vinyl alcohol copolymer, said polypropylene being used to form inner and outer layers and said ethylene-vinyl alcohol copolymer being used to form an intermediate layer between said inner and outer layers and wherein said insulating barrier layer is formed from the ethylene-vinyl alcohol copolymer.

8. A method as defined in claim 3 wherein said preform is injection molded from a combination of polypropylene with acrylonitrile, said polypropylene being used to form inner and outer layers and said acrylonitrile being used to form an intermediate layer between said inner and outer layers and wherein said insulating barrier layer is formed from the polypropylene.

9. A method as defined in claim 3 wherein said preform is injection molded from a combination of polycarbonate with polyamide, said polycarbonate being used to form inner and outer layers and said polyamide being used to form an intermediate layer between said inner and outer layers and wherein said insulating barrier layer is formed from the polyamide.

10. A method as defined in claim 4, wherein said hot-runner nozzle includes a plurality of concentrically arranged passages, and wherein said polyethylene terephthalate is charged through an outermost passage of the hot-runner nozzle, the hot-runner nozzle being maintained at a temperature substantially equal to the molding temperature of said polyethylene terephthalate by a heating means disposed around the outermost passage.

11. A method of injection molding a multi-ply product by charging a plurality of molten plastic materials into an injection cavity mold through a hot-runner nozzle operatively connected to the injection cavity mold and which hot-runner nozzle includes a plurality of concentrically arranged passages, said method comprising the steps of:

injection molding a dummy article having a single layer by charging a most thermostable one of said plastic materials into said injection cavity mold through an outermost passage of the hot-runner nozzle, whereby said one plastic material is precharged into a recess formed to communicate with an exit port for the hot-runner nozzle, said recess being located at an interface between the hot-runner nozzle and the injection cavity mold;

removing said dummy article from said injection cavity mold leaving a solidified plastic material from the dummy article to form an insulator in the recess; and maintaining said one plastic material forming said insulator solidified in said recess as an insulating barrier layer between the injection cavity mold and the hot-runner nozzle, and maintaining the hot-runner nozzle at a temperature substantially equal to the molding temperature of said one plastic material forming said insulator by a heating means disposed around the outermost passage during successive steps of injection molding multi-ply products from said molten plastic materials.

* * * * *